United States Patent
Nagayama (10) Patent No.: US 10,828,781 B2
(45) Date of Patent: Nov. 10, 2020

(54) CALIBRATION SYSTEM AND CALIBRATION METHOD FOR HORIZONTAL ARTICULATED ROBOT

(71) Applicant: Fanuc Corporation, Yamanashi (JP)

(72) Inventor: Tomoaki Nagayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 101 days.

(21) Appl. No.: 16/164,234

(22) Filed: Oct. 18, 2018

(65) Prior Publication Data

US 2019/0160680 A1   May 30, 2019

(30) Foreign Application Priority Data

Nov. 24, 2017   (JP) .................................. 2017-225816

(51) Int. Cl.
   *B25J 9/16*   (2006.01)

(52) U.S. Cl.
   CPC ... *B25J 9/1692* (2013.01); *G05B 2219/39048* (2013.01)

(58) Field of Classification Search
   CPC .................... B25J 9/1692; G05B 2219/39048
   See application file for complete search history.

(56) References Cited

U.S. PATENT DOCUMENTS

| | | |
|---|---|---|
| 4,481,592 A | 11/1984 | Jacobs et al. |
| 4,702,665 A | 10/1987 | Nakashima et al. |
| 5,639,204 A | 6/1997 | Nihei et al. |
| 5,714,674 A | 2/1998 | Tsukuda et al. |
| 2006/0196062 A1 | 9/2006 | Nishibashi et al. |
| 2014/0277722 A1* | 9/2014 | Nagai .................... B25J 9/1692 700/254 |
| 2017/0021495 A1 | 1/2017 | Davis |
| 2018/0021955 A1* | 1/2018 | Hatanaka ............... B25J 9/1692 700/254 |

FOREIGN PATENT DOCUMENTS

| | | |
|---|---|---|
| EP | 0149682 A1 | 7/1985 |
| EP | 0734816 A1 | 10/1996 |
| EP | 1698954 A1 | 9/2006 |
| EP | 2783806 A2 | 10/2014 |

(Continued)

OTHER PUBLICATIONS

Matsui, Hironori; Decision to Grant a Patent; Japanese Patent Application No. 2017-225816; dated Mar. 3, 2020; 3 pages.

(Continued)

*Primary Examiner* — Herbert K Roberts
*Assistant Examiner* — John M Royston
(74) *Attorney, Agent, or Firm* — Shackelford, Bowen, McKinley & Norton, LLP (57) ABSTRACT

Provided is a calibration system for a horizontal articulated robot, the system including: an installation surface on which a base of the horizontal articulated robot is installed; two reference surfaces that are provided on the base, that intersect with the installation surface, and that intersect with each other; and a positioning jig that is attached to a distal end of the horizontal articulated robot and that has three positioning surfaces, which respectively and simultaneously come into contact with the installation surface and the two reference surfaces.

4 Claims, 5 Drawing Sheets

(56) References Cited

FOREIGN PATENT DOCUMENTS

| JP | S60-020878 A | 2/1985 |
|----|--------------|--------|
| JP | S61-274886 A | 12/1986 |
| JP | S62-063091 A | 3/1987 |
| JP | S62-148173 A | 7/1987 |
| JP | H03-079283 A | 4/1991 |
| JP | H05-337856 A | 12/1993 |
| JP | H06-031661 A | 2/1994 |
| JP | H06-320453 A | 11/1994 |
| JP | H08-090466 A | 4/1996 |
| JP | H08-171411 A | 7/1996 |
| JP | H08-276390 A | 10/1996 |
| JP | 2006-243983 A | 9/2006 |
| JP | 2014-176943 A | 9/2014 |
| JP | 2015-077649 A | 4/2015 |

OTHER PUBLICATIONS

Matsui, Hironori; Notice of Reasons for Refusal for Japanese Patent Application No. 2017-225816; dated Nov. 12, 2019; 4 pages.
Techno Search, Inc.; Search Report by Registered Search Organinzation; Japanese Patent Application No. 2017-225816; dated Oct. 10, 2019; 7 pages.
The State Intellectual Property Office of the People's Republic of China; First Office Action; Chinese Application No. 201811366151.3; dated Jun. 30, 2020; 8 pages.

* cited by examiner

CALIBRATION SYSTEM AND CALIBRATION METHOD FOR HORIZONTAL ARTICULATED ROBOT

CROSS-REFERENCE TO RELATED APPLICATIONS

This application is based on Japanese Patent Application No. 2017-225816, the contents of which are incorporated herein by reference.

TECHNICAL FIELD

The present invention relates to a calibration system and a calibration method for a horizontal articulated robot.

BACKGROUND ART

There is a known method in which a box-shaped base jig is fixed to a base of an articulated robot fixed on an installation surface, a cuboid distal-end jig is attached to the distal end of the articulated robot, and by releasing a braking function for each shaft of the articulated robot, three mutually orthogonal surfaces of the distal-end jig are pressed against three surfaces on the inner side of a box shape formed in the base jig to calibrate the origin (for example, see Japanese Unexamined Patent Application, Publication No. Hei 6-320453).

SUMMARY OF INVENTION

An aspect of the present invention provides a calibration system for a horizontal articulated robot, the system including: an installation surface on which a base of the horizontal articulated robot is installed; reference surfaces that are provided on the base and that define two directions intersecting with the installation surface and intersecting with each other; and a positioning jig that is attached to a distal end of the horizontal articulated robot and that has positioning surfaces, in three directions, which respectively and simultaneously come into contact with the installation surface and the reference surfaces.

Another aspect of the present invention provides a calibration method for a horizontal articulated robot, the method including: an installation step of installing a base of the horizontal articulated robot on an installation surface; an attachment step of attaching a positioning jig to a distal end of the horizontal articulated robot; a braking release step of releasing a braking function of the horizontal articulated robot; and a positioning step in which positioning surfaces, in three directions, formed on the positioning jig are respectively pressed against the installation surface and reference surfaces that are provided on the base and that define two directions intersecting with the installation surface and intersecting with each other.

DESCRIPTION OF EMBODIMENT

A calibration system for a horizontal articulated robot according to an embodiment of the present invention will be described below with reference to the drawings.

Figure 1:
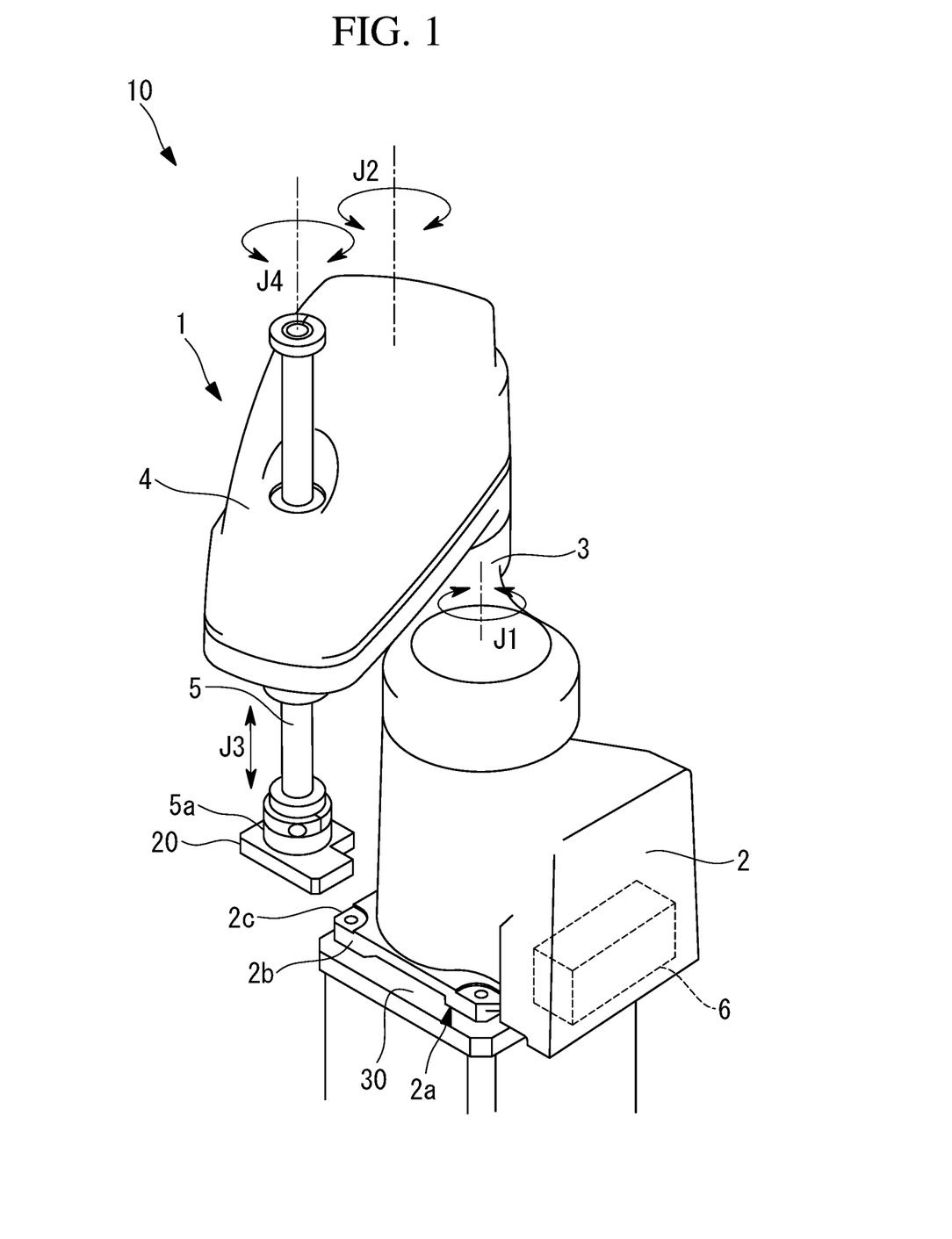
FIG. 1 is a perspective view of a calibration system for a horizontal articulated robot according to this embodiment.

FIG. 1 is a schematic diagram showing a calibration system 10 for a horizontal articulated robot 1 according to this embodiment. As shown in FIG. 1, the calibration system 10 for the horizontal articulated robot (hereinafter simply referred to as "robot") 1 is provided with: a first reference surface 2b and a second reference surface 2c that are formed on a base 2 of the robot 1; an installation surface 30 on which the base 2 of the robot 1 is installed; and a flat plate-shaped positioning jig 20 that is attached to a distal end 5a of a second arm 5 of the robot 1. The robot 1 is provided with: the base 2; a revolving body 3 that is supported so as to be rotatable about a vertical first axis J1 with respect to the base 2; a first arm 4 that is supported so as to be rotatable about a vertical second axis J2 with respect to the revolving body 3; and the second arm 5, which can be vertically moved with respect to the first arm 4 along a third axis J3 parallel to the vertical direction and which can be rotated about a fourth axis J4.

Four shafts J1-J4 in the robot 1 are respectively driven by rotation of rotating shafts of four motors (not shown). Each of the motors is provided with an encoder (not shown) that detects a rotation angle of the motor. The robot 1 is provided with a control device 6 that performs feedback control of the individual motors by using the rotation angles of the individual motors, which are detected by the encoders.

With the robot 1, a plate portion 2a located on the bottom side of the base 2 is fixed on the installation surface 30 by means of bolts. As shown in FIG. 1, the first reference surface (reference surface) 2b and the second reference surface (reference surface) 2c, which are formed so as to be orthogonal to the installation surface 30, are formed at a corner of the plate portion 2a of the base 2. The first reference surface 2b and the second reference surface 2c are planes that are orthogonal to each other and that are processed so as to have a certain level of flatness or higher. Because the robot 1 is heavy, the installation surface 30 in this embodiment is formed so as to have high rigidity. The installation surface 30 is processed so as to have a certain level of flatness or higher.

Figure 2:
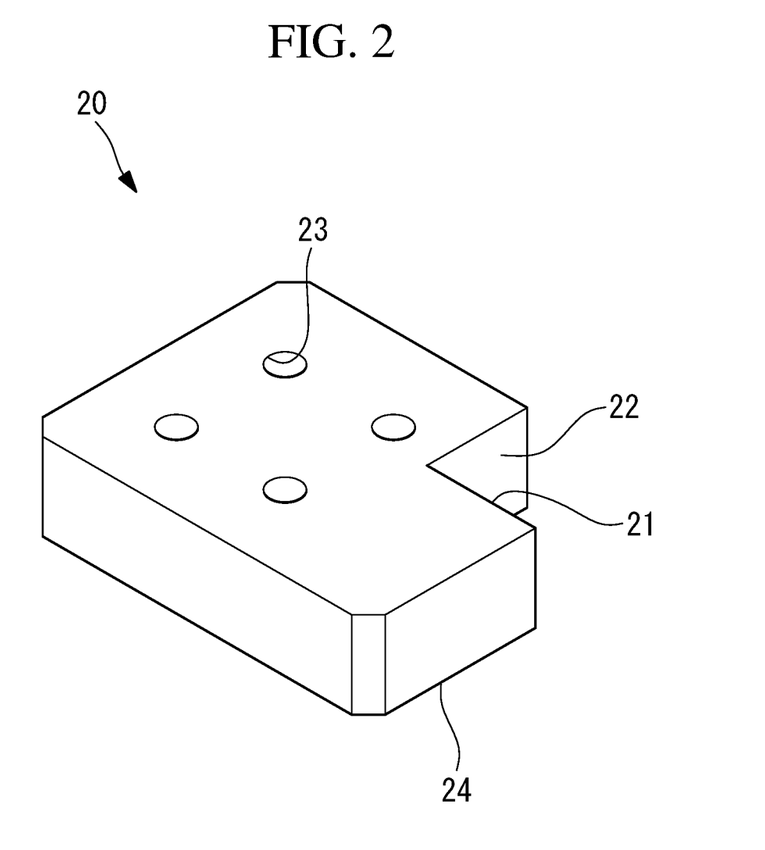
FIG. 2 is a perspective view of a positioning jig, which is a part of the calibration system.

The positioning jig 20 is attached to the distal end 5a of the second arm 5 of the robot 1 by means of bolts. The positioning jig 20 is a jig used for calibrating the origin of the robot 1. As shown in FIG. 2, the positioning jig 20 has a shape in which a cuboid part is cut out from a rectangular flat plate shape. The positioning jig 20 is provided with: four bolt insertion holes 23 that penetrate therethrough in the thickness direction; a first side surface (positioning surface) 21 which is one side surface of the cut-out shape; a second side surface (positioning surface) 22 which is the other side surface of the cut-out shape; and a bottom surface (positioning surface) 24 that faces downward when the positioning jig 20 is attached to the distal end 5a of the robot 1. The first side surface 21, the second side surface 22, and the bottom surface 24 are planes that are orthogonal to each other and are processed so as to have a certain level of flatness or higher.

Figure 3:
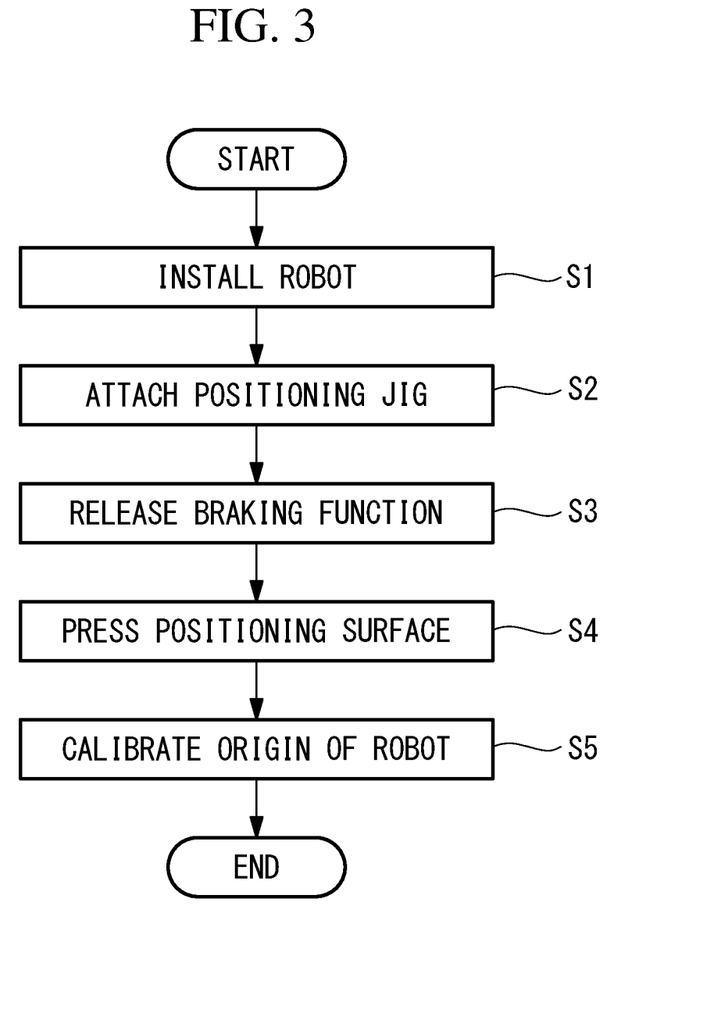
FIG. 3 is a flowchart showing a calibration method for the horizontal articulated robot.

In the following, a process for calibrating the origin of the robot 1 will be described according to a flowchart in FIG. 3, showing a calibration method for the robot 1. In the calibration method shown in FIG. 3, first, an installation step of installing the robot 1 on the installation surface 30 is performed (step S1). The base 2 of the robot 1 installed on the installation surface 30 is fixed on the installation surface 30 by means of the bolts. Next, an attachment step of attaching the positioning jig 20 to the distal end 5a of the second arm 5 of the robot 1 installed on the installation surface 30 is performed (step S2). The bolts inserted into the four bolt insertion holes 23 of the positioning jig 20 are screwed into bolt holes formed at the distal end 5a of the second arm 5, whereby the positioning jig 20 is attached to the distal end 5a of the robot 1.

Next, a braking release step in which the control device 6 releases the braking function of the motors driving the respective shafts J1-J4 of the robot 1 is performed (step S3). When the braking function is released, a worker can manually move the distal end 5a of the robot 1, to which the positioning jig 20 is attached. Next, a positioning step in which the first side surface 21, the second side surface 22, and the bottom surface 24 of the positioning jig 20 are respectively pressed against the first reference surface 2b and the second reference surface 2c of the base 2 of the robot 1 and the installation surface 30 is performed (step S4).

Figure 4:
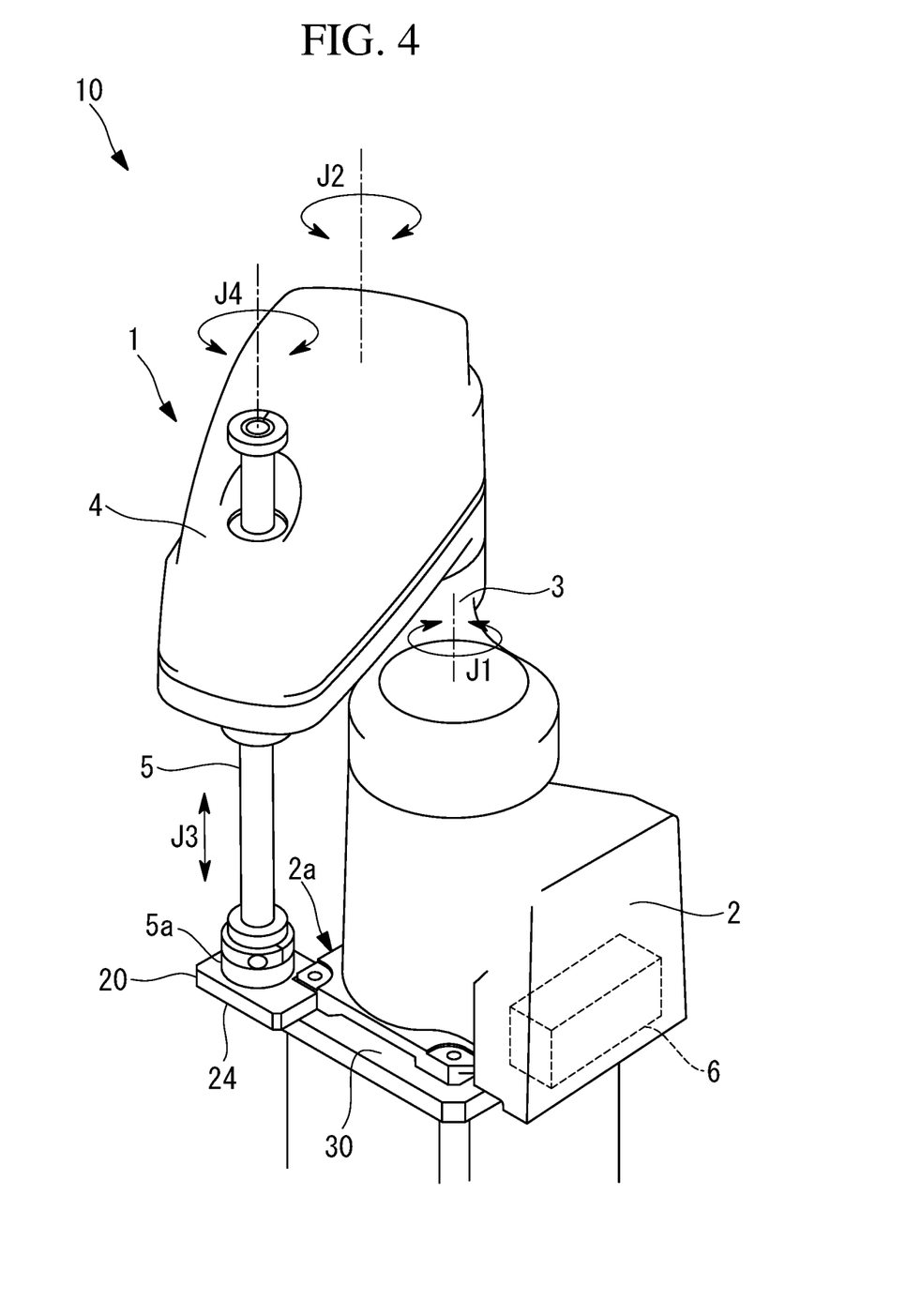
FIG. 4 is a perspective view of the calibration system for the horizontal articulated robot during calibration.
Figure 5:
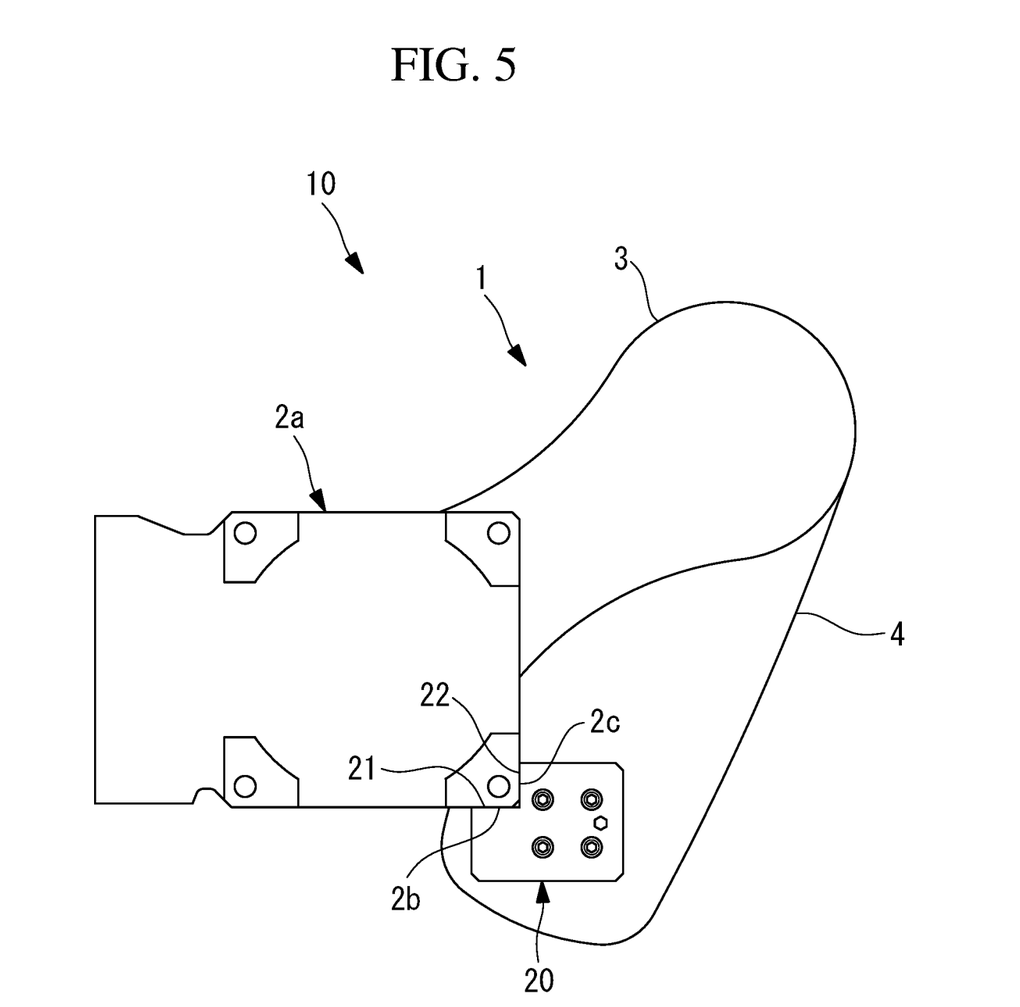
FIG. 5 is a bottom view of the calibration system for the horizontal articulated robot during calibration.

FIGS. 4 and 5 show the positional relationship between the positioning jig 20, and the base 2 and installation surface 30 when the positioning step is performed. As shown in FIG. 4, the bottom surface 24 of the pressed positioning jig 20 is in contact with the installation surface 30. As shown in FIG. 5, the first side surface 21 of the positioning jig 20 is in contact with the first reference surface 2b of the base 2 of the robot 1, and the second side surface 22 of the positioning jig 20 is in contact with the second reference surface 2c of the base 2.

When the positioning step in FIG. 3 is performed, the control device 6 performs calibration of the origin of the robot 1 (step S5). In the process of step S5, the positioning jig 20 is pressed against the installation surface 30 and the base 2, and the position of the distal end 5a of the robot 1 in a state in which the positioning jig 20 is immobilized is set as a calibration position, which is located at a prescribed angular position relative to the origin of the robot 1. By doing so, the origin of the robot 1 is calibrated, and the calibration method for the robot 1 is completed.

As described above, with the calibration system 10 for the robot 1 according to this embodiment, the positioning jig 20 is attached to the distal end 5a of the robot 1 installed on the installation surface 30. In a state in which the braking function of the robot 1 is released, the bottom surface 24, the first side surface 21, and the second side surface 22 of the positioning jig 20 are respectively pressed against the installation surface 30 and the first reference surface 2b and the second reference surface 2c of the base 2 of the robot 1, whereby the origin of the robot 1 is calibrated.

With calibration of the origin of the robot 1 in this embodiment, the installation surface 30 on which the robot 1 is installed is used as one reference surface for defining a direction along the gravity direction. Because the robot 1, having a heavy self-weight, is installed thereon, the installation surface 30 is formed so as to have high rigidity. Because of this, even when the bottom surface 24 of the positioning jig 20 attached to the distal end 5a of the robot 1 is pressed against the installation surface 30 in a state in which the braking function of the robot 1 is released and the distal end 5a thereof is freely movable, the installation surface 30 is not bent, and the position of the distal end 5a relative to the installation surface 30 does not vary. Therefore, with the calibration system 10 for the robot 1 of this embodiment, which includes the installation surface 30, the first reference surface 2b and the second reference surface 2c formed on the base 2 of the robot 1, and the positioning jig 20, calibration of the origin of the robot 1 is performed with higher accuracy. Because it is not necessary to prepare a separate component having high rigidity as a replacement for the installation surface 30 to be in contact with the positioning jig 20, for calibrating the origin of the robot 1, it is possible to provide a calibration jig with low cost and low weight.

Although an example of the calibration system 10 for the robot 1 has been described in the abovementioned embodiment, the calibration system 10 for the robot 1 can be modified in various ways. For example, regarding the shapes of the first side surface 21 and the second side surface 22 of the positioning jig 20 and the first reference surface 2b and the second reference surface 2c formed on the base 2 of the robot 1, for calibrating the origin of the robot 1, the surfaces may be two intersecting planes that are different from the installation surface 30, instead of two orthogonal planes that are in contact with each other. Specifically, for example, the first side surface 21 of the positioning jig 20 and the first reference surface 2b of the base 2 may be planes that come into contact with each other with an inclination of 45 degrees relative to the installation surface 30.

Instead of the reference surface 2b and the reference surface 2c that are directly formed on the base 2, which is a part of the robot 1, two reference surfaces that intersect with the installation surface 30 and that intersect with each other may be formed on a base jig, the position of which is fixed relative to the installation surface 30 and the base 2. Because the self-weight of the robot 1 in which the braking function is released is received by the installation surface 30, the base jig does not need to have high rigidity, and it is possible to reduce the cost and the size of the base jig.

In order to calibrate the origin of the robot 1 in a coordinate system defined by three axes, instead of the reference surface 2b and the reference surface 2c that are formed on the base 2, a curved surface for defining two axes that intersect with the first axis J1, which is orthogonal to the installation surface 30, and that intersect with each other may be formed on a side surface of the base 2, and the positioning jig 20 may have the bottom surface 24 and a curved surface that simultaneously come into contact with the installation surface 30 and said curved surface. In this case, when the bottom surface 24 of the positioning jig 20 attached to the distal end 5a of the robot 1 is pressed against the installation surface 30, a reference point in the height direction is defined, and when the curved surface formed on the positioning jig 20 is pressed against the curved surface formed on the base 2, it is possible to determine the origin in a plane including the reference point in the height direction. As described above, it suffices that the installation surface, the reference surface, and the positioning surfaces be capable of defining axes parallel to the three directions that intersect with each other, when the positioning surfaces are pressed against the installation surface 30 and the reference surface. The three directions that intersect with each other need not be three directions that are orthogonal to each other, and any three directions that are different from each other may be used.

As a result, the following aspect is derived from the above described embodiment.

An aspect of the present invention provides a calibration system for a horizontal articulated robot, the system including: an installation surface on which a base of the horizontal articulated robot is installed; reference surfaces that are provided on the base and that define two directions intersecting with the installation surface and intersecting with each other; and a positioning jig that is attached to a distal end of the horizontal articulated robot and that has positioning surfaces, in three directions, which respectively and simultaneously come into contact with the installation surface and the reference surfaces.

With this aspect, the horizontal articulated robot is fixed on the installation surface via the base, the positioning jig is attached to the distal end of the horizontal articulated robot, and after the braking function of the horizontal articulated robot is released, the distal end of the horizontal articulated robot is moved so that the positioning surfaces, which define the three directions in the positioning jig, respectively come into contact with the installation surface and the reference surfaces, whereby the origin of the horizontal articulated robot is calibrated.

By doing so, because the rigidity of the installation surface on which the horizontal articulated robot is installed is high, when the positioning surface comes into contact with the installation surface in a state in which the braking of the horizontal articulated robot is released, the installation surface is not bent due to the self-weight of the horizontal articulated robot. Because of this, even when the positioning surfaces, which define the three directions in the positioning jig attached to the distal end of the horizontal articulated robot, respectively come into contact with the installation surface and the reference surfaces, the positions of the installation surface and the reference surfaces are not displaced, and it is possible to improve the calibration accuracy for the origin of the horizontal articulated robot. It suffices that the jig used for calibration of the origin include a processed installation surface, reference surfaces that are provided on the base, and a positioning jig attached to the distal end of the horizontal articulated robot, and because it is not necessary to attach a heavy jig having high rigidity to the base, it is possible to reduce the cost and weight of the jig.

In the abovementioned aspect, the installation surface and the reference surfaces may be three planes that are orthogonal to each other.

By doing so, after one positioning surface of the positioning jig attached to the horizontal articulated robot comes into contact with the installation surface, the positioning jig may be moved in a horizontal direction to align the remaining two positioning surfaces with the two reference surfaces, and thus, it is possible to more easily perform calibration of the origin of the horizontal articulated robot.

In the abovementioned aspect, the reference surfaces may be formed on the base.

By doing so, because the reference surfaces used for calibration of the origin are directly formed on the base, which is a part of the horizontal articulated robot, the calibration accuracy for the origin of the horizontal articulated robot is higher compared to the case in which the reference surfaces are formed in a portion other than the horizontal articulated robot.

Another aspect of the present invention provides a calibration method for a horizontal articulated robot, the method including: an installation step of installing a base of the horizontal articulated robot on an installation surface; an attachment step of attaching a positioning jig to a distal end of the horizontal articulated robot; a braking release step of releasing a braking function of the horizontal articulated robot; and a positioning step in which positioning surfaces, in three directions, formed on the positioning jig are respectively pressed against the installation surface and reference surfaces that are provided on the base and that define two directions intersecting with the installation surface and intersecting with each other.

With this aspect, the horizontal articulated robot is fixed on the installation surface via the base, the positioning jig is attached to the distal end of the horizontal articulated robot, and after the braking function of the horizontal articulated robot is released, the positioning surfaces, which define the three directions in the positioning jig, are respectively pressed against the installation surface and the reference surfaces.

By doing so, because the rigidity of the installation surface on which the horizontal articulated robot is installed is high, when the positioning surface is pressed against the installation surface in a state in which the braking of the horizontal articulated robot is released, the installation surface is not bent due to the self-weight of the horizontal articulated robot. Because of this, when the positioning surfaces, which define the three directions in the positioning jig attached to the distal end of the horizontal articulated robot, are respectively pressed against the installation surface and the reference surfaces, the positions of the installation surface and the reference surfaces are not displaced, and it is possible to improve the calibration accuracy for the origin of the horizontal articulated robot. It suffices that the jig used for calibration of the origin include a processed installation surface, reference surfaces that are provided on the base, and a positioning jig attached to the distal end of the horizontal articulated robot, and because it is not necessary to attach a heavy jig having high rigidity to the base, it is possible to reduce the cost and weight of the jig.

REFERENCE SIGNS LIST 1 horizontal articulated robot
2 base
2b first reference surface (reference surface)
2c second reference surface (reference surface)
5a distal end of horizontal articulated robot
10 calibration system
21 first side surface of positioning jig (positioning surface)
22 second side surface of positioning jig (positioning surface)
24 bottom surface of positioning jig (positioning surface)
S1 installation step
S2 attachment step
S3 braking release step
S4 positioning step

The invention claimed is:

1. A calibration system for a horizontal articulated robot, the calibration system comprising:
   an installation surface on which a base of the horizontal articulated robot is installed;
   reference surfaces that are provided on the base and that define two directions intersecting with the installation surface and intersecting with each other; and
   a positioning jig that is attached to a distal end of the horizontal articulated robot and that has positioning surfaces, in three directions, which respectively and simultaneously come into contact with the installation surface and the reference surfaces.

2. The calibration system according to claim 1, wherein the installation surface and the reference surfaces are three planes that are orthogonal to each other.

3. The calibration system according to claim 1, wherein the reference surfaces are formed on the base.

4. A calibration method for a horizontal articulated robot, the calibration method comprising:

installing a base of the horizontal articulated robot on an installation surface;
attaching a positioning jig to a distal end of the horizontal articulated robot;
releasing a braking function of the horizontal articulated robot; and
a positioning step in which positioning surfaces, in three directions, formed on the positioning jig are respectively pressed against the installation surface and reference surfaces that are provided on the base and that define two directions intersecting with the installation surface and intersecting with each other.

\* \* \* \* \*